US008554658B2

(12) United States Patent
Hodgson

(10) Patent No.: US 8,554,658 B2
(45) Date of Patent: Oct. 8, 2013

(54) METHOD AND SYSTEM OF TRADING A STANDARDIZED CONTRACT

(71) Applicant: Michael John Hodgson, London (GB)

(72) Inventor: Michael John Hodgson, London (GB)

(73) Assignee: Hodgson Global Enterprises Limited, London (GB)

( * ) Notice: Subject to any disclaimer, the term of this patent is extended or adjusted under 35 U.S.C. 154(b) by 0 days.

(21) Appl. No.: 13/863,372

(22) Filed: Apr. 15, 2013

(65) Prior Publication Data

US 2013/0232054 A1      Sep. 5, 2013

Related U.S. Application Data

(60) Continuation of application No. 12/697,106, filed on Jan. 29, 2010, now Pat. No. 8,423,448, which is a division of application No. 10/631,107, filed on Jul. 31, 2003, now Pat. No. 7,668,774.

(60) Provisional application No. 60/400,358, filed on Jul. 31, 2002, provisional application No. 60/429,889, filed on Nov. 26, 2002.

(51) Int. Cl.
*G06Q 40/00* (2012.01)

(52) U.S. Cl.
USPC ............................................. 705/36

(58) Field of Classification Search
USPC .................................................. 705/36 R, 37
See application file for complete search history.

(56) References Cited

U.S. PATENT DOCUMENTS

| 6,304,858 B1 * | 10/2001 | Mosler et al. ............... 705/37 |
| 2001/0056392 A1 * | 12/2001 | Daughtery, III ............... 705/36 |
| 2003/0101125 A1 * | 5/2003 | McGill et al. ............... 705/37 |
| 2004/0019555 A1 * | 1/2004 | Lara ............... 705/37 |

* cited by examiner

*Primary Examiner* — Samica L Norman
(74) *Attorney, Agent, or Firm* — TransPacific Law Group; Pavel Pogodin, Esq.

(57) ABSTRACT

A system, method, and corresponding computer program product facilitates trading of a standardized contract. The terms of the contract may be such that it provides a payout from one party to the other based on the price, yield, level or other measure of an asset, basket, index, financial contract, other financial instrument or some economically significant variable observed at or around two specified times, both such times being after the time that the standardized contract is first available for trading. Alternatively, the terms of the contract may be such that it provides that one party has the right but not the obligation either to purchase or to sell some asset at a price which is determined at a first specified time, such right to be exercised at some time not later than the second specified time, both such times being after the time that the standardized contract is first available for trading. These and other related contracts are described.

16 Claims, 6 Drawing Sheets

METHOD AND SYSTEM OF TRADING A STANDARDIZED CONTRACT

CROSS-REFERENCE TO RELATED APPLICATIONS

This patent application claims the benefit of priority of and is a continuation of U.S. patent application Ser. No. 12/697,106 filed on Jan. 29, 2010 (pending), which claims the benefit of priority of and is a divisional of U.S. patent application Ser. No. 10/631,107 filed on Jul. 31, 2003 (now issued as a U.S. Pat. No. 7,668,774), which claims the benefit of priority of Provisional Application No. 60/400,358, filed Jul. 31, 2002, and Provisional Application No. 60/429,889, filed Nov. 26, 2002. The present application incorporates the disclosure of all of these patent applications by reference.

FIELD OF THE INVENTION

This invention relates to a system, method, and corresponding computer program product containing code for implementing the method, for trading and settling a contract. More specifically, this invention relates to a system, method, and corresponding computer program product for trading and settling a contract which has a price based on the expectation of the rise or fall (measured in some fashion, according to the particular embodiment) of some underlying between two specified times, both such times being after the time that the contract is first available for trading. The underlying may be an asset, (financial, physical or other), basket, index, contract, other financial instrument or other economically significant variable(s) (including weather and geological data).

BACKGROUND OF THE INVENTION

There are a number of terms used herein which whose meanings will be well known to those of working skill in the field of financial markets. However, for ease of reference, the following table contains definitions of terms:

Yield—The "yield" of an investment is a measure of its expected annualised return, (arising from income only or including capital appreciation or depreciation). In the case of most interest rate futures contracts, the "yield" which corresponds to the contract's price is 100% minus the price.

Options—The collective term for "call options" and "put options" (q.v.), and occasionally also for other "derivatives" (q.v.).

Call option or Call—A contract which, if "physically-settled," gives one party, (the "option buyer"), the right, but not the obligation, to purchase from the other party, (the "option seller"), a certain quantity of an asset or other financial instrument at a fixed price, (the "strike price" or "strike"), at a specified time or times. If the call option is "cash-settled," then, upon electing to exercise the option, the option buyer receives from the option seller a cash amount equal to the economic benefit that would arise if the option had been physically-settled, i.e. by reference to the excess of the underlying over the strike.

Put option or Put—A contract which, if "physically-settled," gives one party, (the "option buyer"), the right, but not the obligation, to sell to the other party, (the "option seller"), a certain quantity of an asset or other financial instrument at a fixed price, (the "strike price" or "strike"), at a specified time or times. If the put option is "cash-settled," then, upon electing to exercise the option, the option buyer receives from the option seller a cash amount equal to the economic benefit that would arise if the option had been physically-settled, i.e. by reference to the excess of the strike over the underlying.

Derivatives—Contracts (including options) whose economic performance are dependent on the evolution of the price, yield or level of an asset, basket, index, contract or other financial instrument, or on the evolution of some other economically significant variable (including weather and geological data).

Underlying—The asset, basket, index, contract, other financial instrument or other economically significant variable, (and, interchangeably, the price, yield or level thereof), to which a derivative contract's performance is linked.

Hedge—"To hedge" is to invest in an asset or other financial instrument or to enter into a financial contract, (in any instance, a "hedge"), so as to offset the risk associated with other assets, financial instruments and/or financial contracts.

Delta-hedge—"To delta-hedge" an option position is to manage dynamically the amount, ("the delta-hedge"), of a direct exposure to the underlying of that option so as to neutralise the option's instantaneous price sensitivity to small changes in the price, yield or level of the underlying.

Mark-to-market revaluation—The revaluation of a position based on its prevailing market price.

Bid price—A price proffered for the purchase of an asset or other financial instrument.

Offered price—A price proffered for the sale of an asset or other financial instrument.

Mid-market—The price midway between the best readily-available bid and offered prices.

Expiration—The last time, according to the terms of an option contract, that the option buyer can exercise his right.

Liquidity—The ease with which one can buy or sell an asset or other financial instrument quickly and in large volume without substantially affecting the asset or financial instrument's price, usually characterised by narrowly separated bid and offered prices.

Term structure—The observed dependence of a financial measure on term or maturity, (e.g. the dependence of yield on redemption date in the case of government bonds, or the dependence of implied volatility on the expiration date in the case of options, etc.)

Duration—A measure of the sensitivity to interest rates of the value of a portfolio of bonds or other interest-rate sensitive instruments. It is defined as that maturity of notional zero-coupon bond having the same monetary value as the portfolio which also would have the same sensitivity as the portfolio to a single small change in interest rates applied equally to all maturities. Duration therefore takes no account of non-uniform changes in the interest rate term structure.

Present-Value-of-a-Basis-Point—A measure of the sensitivity of a portfolio of bonds or other interest-rate sensitive instruments in monetary terms to a 0.01% change in interest rates applied to all maturities. Present-Value-of-a-Basis-Point therefore takes no account of non-uniform changes in the interest rate term structure.

Futures (and options) exchange—An organisation that brings together buyers and sellers of futures (and options) contracts by, for example, open outcry or electronic trading.

Strike price or Strike—See "Call option or Call" and "Put option or Put".

Clearinghouse—The clearinghouse of a futures (and options) exchange acts as the seller to all buyers and the buyer to all sellers of futures (and options) contracts transacted. As participants may both buy and sell contracts on many occasions, this function of the clearinghouse eliminates the need for keeping track of the complex and long list of successive buyers and sellers of each contract. Additionally, participants are not exposed to default on the contracts by the other participants. Each participant holds an account with a "clearinghouse member" which margins the account of the participant. The clearinghouse margins the accounts of the clearinghouse members.

Margin—"Margin" is the amount of money that the clearinghouse or clearinghouse member requires as deposit in order to maintain a position. "Margining" is the practice, usually undertaken daily, of maintaining a minimum margin with a clearinghouse or clearinghouse member taking account of accrued profits and losses on participants' positions. The purpose of margining is to protect the clearinghouse and clearinghouse members from defaults.

Cash-settled—See "Call option or Call" and "Put option or Put"

At-the-money—An option is at-the-money when the price of the underlying and the strike are the same.

Discount factor—A multiplier used to convert a future cashflow to its present value, and is dependent on interest rates and the period until that cashflow occurs.

Premium—The cost of purchasing an option.

Basis risk—The residual risk arising from the use of a proxy hedge.

Rolling a contract—Closing a position in one futures or options contract and simultaneously establishing an identical position in the futures or options contract with a later expiration.

Contract month—The month in which a futures or options contract expires. Usually all contracts of the same type but with different expirations expire in different months, and so the contract month is used to distinguish them.

Proxy hedge—A hedge whose performance is not perfectly correlated with the performance of the asset, basket, index, contract, other financial instrument or other economically significant variable being hedged.

Straddle—An option position comprising a call option and a put option (q.v.) with identical underlyings, quantities, strikes and expirations.

Strangle—An option position comprising a call option and a put option (q.v.) with identical underlyings, quantities and expirations, but different strikes.

Physically-settled option—See "Call Option or Call" and "Put option or Put".

Over-the-counter—An "over-the-counter" (OTC) market is an informal market that does not involve a futures exchange.

Open outcry—The method of trading futures and options contracts whereby brokers (and traders) congregate at the designated exchange premises and express their intentions to buy or sell by calling out and by the use of hand signals.

Electronic trading—The method of trading whereby brokers' and traders' orders are submitted to a computer system which identifies and executes matching trades.

In-the-money—An option is in-the-money if, in the case of a call option, the underlying exceeds the strike or, in the case of a put option, the strike exceeds the underlying.

Out-of-the-money—An option is out-of-the-money if, in the case of a call option, the strike exceeds the underlying or, in the case of a put option, the underlying exceeds the strike.

The pricing and hedging of options and certain other derivatives, (which will be collectively referred to as "options" herein for the sake of convenience), was given a strong mathematical foundation by the work of F. Black and M. Scholes. See, e.g., Black, F. and Scholes, M., (1973), "The Pricing of Options and Corporate Liabilities," *Journal of Political Economy*, 81, 637. Black and Scholes made a number of idealised assumptions about markets and price behaviour. In particular, they assumed that the price, S, of the underlying asset of an option follows a geometric Brownian process governed by the stochastic differential equation:

$$\frac{dS}{S} = \mu dt + \sigma dz$$

where $\mu$ is a drift rate, $\sigma$ is a diffusion constant known as the volatility, dt is an infinitesimal increment in time, and dz is the infinitesimal change in a variable, z, which follows a standard Wiener process, (where dz has expectation equal to zero and variance equal to dt).

From this model, Black and Scholes, and many others have been able to derive formulae and algorithms for valuing a wide variety of option types. Somewhat paradoxically, the option values do not depend on the drift rate, $\mu$. The central problem for obtaining numerical values for option prices has thus been the determination of the volatility, a, since this is not directly observable.

Although Black and Scholes' model assumes that the volatility of the underlying is constant, it is observed that volatilities in general are neither constant nor entirely predictable.

Future volatility can either be estimated from previously experienced volatility, (known as the "historical volatility"), or by deducing the volatility consistent with the prevailing observable prices of options, (known as the "implied volatility"). Because the latter is forward-looking, it is generally regarded as the better estimate.

The implied volatility at which options trade for many underlyings, (or the mid-market implied volatility between bid and offered prices), usually varies from maturity to maturity so that there is a discernible term structure of implied volatility. Financial institutions frequently model this by assuming that the volatility of the underlying varies through time in an entirely deterministic way, (i.e. they assume $\sigma = \sigma(t)$), which we refer to as the "time-dependent Black-Scholes framework".

Because of the enormous growth in the volume of options traded by financial institutions, (as well as by end users), financial institutions have become very sensitised to their exposure to changes in both (i) future realised volatility—which affects the cost or benefit of delta-hedging their option positions—and (ii) implied volatility—largely driven by supply and demand factors and which affects the mark-to-market revaluation of their option positions.

The sensitivity of the value of an option position, X, to small changes in the overall level of implied volatility is usually referred to as the "vega," $\kappa$, of the option position, defined as:

$$\kappa = \frac{\partial X}{\partial \sigma}$$

However, financial institutions with portfolios containing many option positions are not just exposed to uniform changes in volatility, but also are exposed to non-uniform changes in the implied volatility term structure. Just as the Duration or the Present-Value-of-a-Basis-Point of a bond portfolio is no longer considered a sufficiently accurate measure of interest rate exposure, the overall vega of an option portfolio is no longer considered a sufficiently accurate measure of volatility exposure.

In the case of interest rates, financial institutions are able to hedge their exposure to changes in the term structure, (at least, in respect of the major currencies), very efficiently by trading the highly liquid interest rate futures and bond futures on the futures exchanges. By selecting the appropriate contract or contracts, exposure to interest rates at a specific maturity can be hedged.

In the case of volatility, however, the ability of financial institutions to hedge their exposure to changes in the term structure on the futures exchanges is much more restricted. Whilst regular exchange-traded call and put options may be used to hedge volatility exposure, they suffer from a number of disadvantages:

1) The liquidity of exchange-traded options, (except at short maturities), is typically relatively low. This can be attributed to the fact that, for each maturity, many different option strikes are available, which has the effect of fragmenting liquidity.
2) The price, (and hence the profitability), of regular call and put options are sensitive to a number of other variables besides volatility, not the least of which is the level of the underlying.
3) The vega of regular call and put options is not constant and is itself dependent on a number of other variables, particularly the level of the underlying. This means that, unless the terms of the calls or puts traded match quite closely the options being hedged, the net exposure to volatility may behave quite unpredictably over time.

Points 2 and 3 are also important considerations for financial institutions or speculators who wish to take positions that express a pure volatility view. If the volatility exposure of a position is contaminated by a number of other exposures, then the profitability of that position will be contaminated by the profitability (or otherwise) relating to those other exposures.

It would be desirable to provide a contract which enables speculators and financial institutions to take a view on volatility uncontaminated by other exposures. It also would be desirable to provide a contract which enables financial institutions to hedge volatility exposure uncontaminated by other exposures.

Aside from being exposed to changes in the term structure of volatility, market professionals are also exposed to sudden jumps in the underlying. Sudden jumps in the underlying can cause a material mismatch between the performance of the delta-hedge and the performance of the option portfolio being hedged. This risk is usually measured by the "gamma," Γ, of the portfolio, which is the local sensitivity of the "delta," (the theoretical quantity of delta-hedge required to hedge the portfolio), to changes in the underlying. The delta is:

$$\Delta = \frac{\partial X}{\partial S}$$

and therefore the gamma is:

$$\Gamma = \frac{\partial \Delta}{\partial S} = \frac{\partial^2 X}{\partial S^2}$$

It would be desirable if the contract that is provided also enables financial institutions to hedge their gamma exposures.

Other relevant background is provided in F. Black, "The Pricing of Commodity Contracts," (1976), *Journal of Financial Economics*, 3, 167; and D. R. Cox and H. D. Miller, "The Theory of Stochastic Processes," (1965), London: Chapman & Hall.

SUMMARY OF THE INVENTION

In view of the foregoing, according to one feature of the present invention, financial institutions, through certain forms of contract described herein, can trade and hedge the volatility level of some underlying relating to a future time slice. If there is a series of such contracts available relating to contiguous (or nearly contiguous) time slices, then it will be possible to combine positions in order to create a chosen time profile of volatility exposure.

The terms of the contract can be described very simply without reference to volatility at all. This means that the contract terms can be easily understood by speculators who have no technical knowledge of volatility; an assessment of cheapness or richness can be made based simply on a comparison of break-even and historical performance.

BRIEF DESCRIPTION OF THE DRAWINGS

The invention now will be described in detail with reference to exemplary embodiments. In the drawings.

DETAILED DESCRIPTION OF EMBODIMENTS

Figure 1:
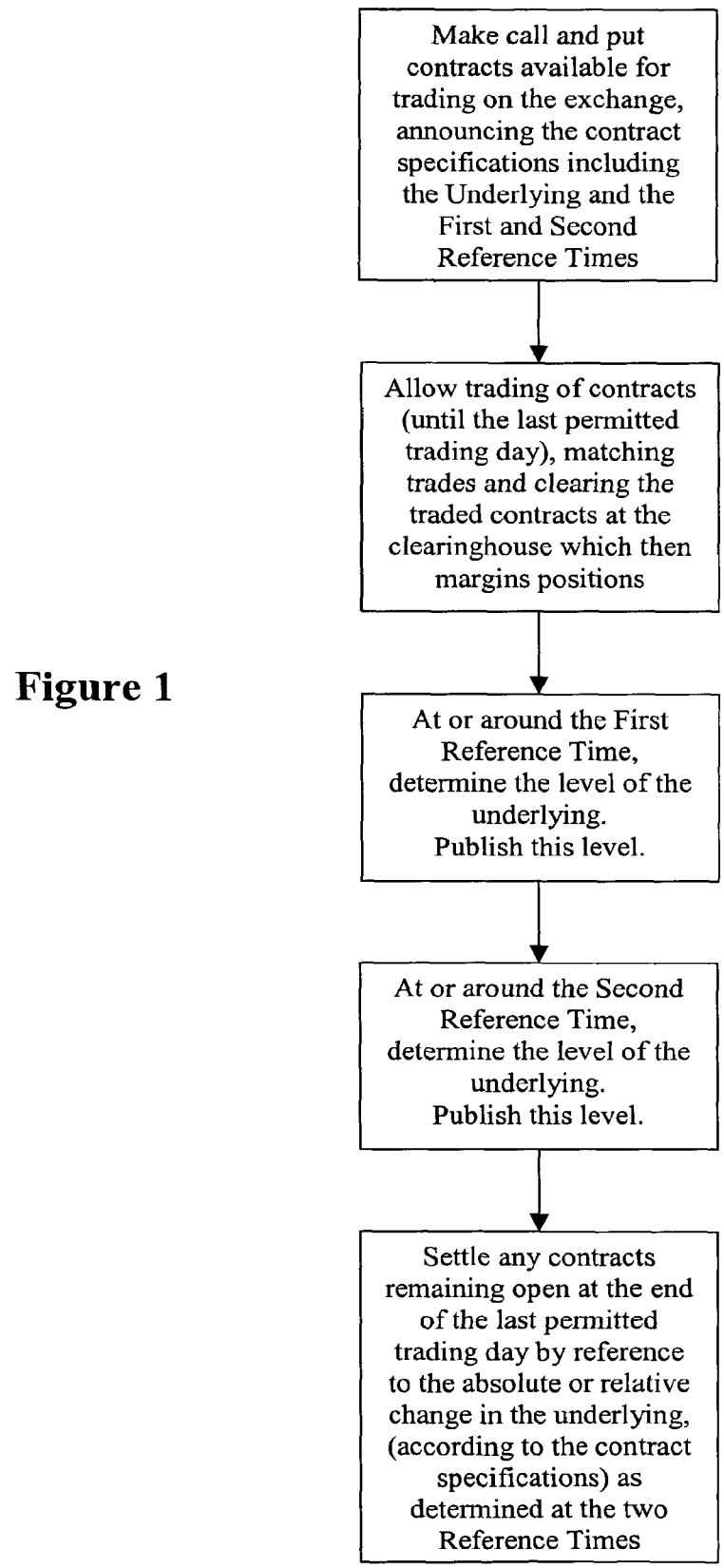
FIG. 1 is an exemplary flow of the overall process according to the invention.

In the embodiments described below, the contract ideally trades through an exchange and settles through a clearinghouse, thereby providing participants with the benefits of anonymity and much reduced likelihood of counterparty default on the contracts. Additionally, the participants' positions are margined to protect the clearinghouse members from default on the part of the participants.

In accordance with one embodiment, the contract has a payout equal to the percentage gain, if any, of some underlying from a First Reference Time to a Second Reference Time (later than the First Reference Time) multiplied by some specified currency amount. The time interval between the First Reference Time and the Second Reference Time is the period, the "Reference Period," in relation to which a volatility exposure may be gained through the contract and might typically be three months. Three months would generally be considered neither too long as to be too blunt a hedge for short periods of volatility, nor too short so as to require a combination of too large a number of different contracts (with contiguous Reference Periods) to hedge the volatility relating to a period of, say, a few years. The contract is first made available for trading prior to the First Reference Time.

Effectively, this contract is a cash-settled call option contract whose strike is fixed at-the-money at the First Reference Time.

To illustrate how this contract provides an exposure to volatility, we can consider the case in which the underlying is the price of a futures contract or the corresponding yield of an interest rate futures contract. In that case, at any time prior to and until the First Reference Time, the price of the option contract is related to the implied volatility for the Reference Period, in the Black-Scholes framework, by the equation:

$$V_C^- = D \cdot \left[ N\left(\frac{\sigma\sqrt{\tau}}{2}\right) - N\left(-\frac{\sigma\sqrt{\tau}}{2}\right) \right]$$

where:
$V_C^-$ is the price of the option contract per unit of the specified currency amount, at a time prior to and until the First Reference Time, (the '−' superscript denotes 'prior to and until the First Reference Time' and the 'C' subscript denotes a 'call'-type contract);
D is the applicable discount factor representing the cost of financing the premium from the time of payment until the final settlement of outstanding contracts after the Second Reference Time;
$N(\cdot)$ is the standard cumulative Normal distribution function given by:

$$N(z) = \int_{-\infty}^{z} \frac{e^{-x^2/2}}{\sqrt{2\pi}} dx$$

$\sigma$ is the prevailing implied volatility of the underlying relating to the Reference Period; and
$\tau$ is the length of the Reference Period in years.

The price of the option contract therefore reflects the prevailing market level of the implied volatility of the underlying relating to the Reference Period.

Furthermore, if the option contract's terms specify that the payment of the premium is deferred until maturity so that, (as with a standard cash-settled futures contract), there is simply a net settlement of the traded price against the final settlement price, then D is 1, (i.e. no financing), and the option contract's price is not dependent on D. Otherwise, the exposure to changes in D can be mitigated by financing or depositing the premium at prevailing rates to the Second Reference Time. For simplicity of exposition, we consider the specific case for which D is 1, although the extension to the case where D≠1 is straightforward.

In the case where D is 1, we see that the price of the option contract, $V_C^-$, prior to the First Reference Time, is a function of the implied volatility only, (as $\tau$ is fixed). Moreover, the relationship between $V_C^-$ and $\sigma$ is very nearly a proportionate one for typical values of $\sigma$ and $\sqrt{\tau}$, (i.e. $\sigma\sqrt{\tau}<1$). This is because the Maclaurin series for $V_C^-$ (in terms of $\sigma\sqrt{\tau}$) has no zero-th order or second order term −$V_C^-$ is the difference between $N(z)$ and $N(-z)$ in the near-linear part of $N(z)$ either side of the inflection. More explicitly, $V_C^-$ is approximately given by:

$$V_C^- \approx \frac{\sigma\sqrt{\tau}}{\sqrt{2\pi}}$$

At a volatility of 50% and for $\tau$=0.25, the Black-Scholes value of the option contract is 9.9477% whilst the linear approximation gives 9.9736%, overstating the Black-Scholes value by only 0.0259%, (all values given to the fourth decimal place when expressed as a decimal). (As $\sqrt{\tau}$=0.50, it may be considered convenient to use 0.40 as an approximate value of $1/\sqrt{(2\pi)}$, which very readily gives a value of 10.0000%).

Prior to the First Reference Time, the option contract's vega is therefore very nearly constant, and is given by:

$$\frac{\partial V_C^-}{\partial \sigma} = \exp\left(-\frac{\sigma^2 \tau}{8}\right) \cdot \frac{\sqrt{\tau}}{\sqrt{2\pi}} \approx \frac{\sqrt{\tau}}{\sqrt{2\pi}}$$

Whilst the relationship between the option contract's price and volatility is not perfectly linear, the non-linearity is a small price to pay for the benefit of simplicity, and, in any case, is something which market professionals should certainly be able to cope with.

At the First Reference Time, the option contract will be struck at-the-money and its market price will determine the implied volatility of the then at-the-money option expiring at the Second Reference Time—the option contract automatically converges to the implied volatility of the relevant at-the-money option at the First Reference Time. Traders can, as a result of this convergence, confidently use this contract to speculate on the implied volatility relating to the Reference Period up until the First Reference Time.

From the First Reference Time the option contract takes the form of a regular call option with a known strike, and at any time thereafter and prior to the Second Reference Time, the price of the option contract is related to the implied volatility for the remaining period, in the Black-Scholes framework, by the equation, (more generally allowing D≠1):

$$V_C^+ = D \cdot \left[ \frac{F}{K} \cdot N\left(\frac{\ln(F/K) + 1/2\sigma_0^2\theta}{\sigma_0\sqrt{\theta}}\right) - N\left(\frac{\ln(F/K) - 1/2\sigma_0^2\theta}{\sigma_0\sqrt{\theta}}\right) \right]$$

where:
$V_C^+$ is the price of the option contract per unit of the specified currency amount, at a time after the First Reference Time and prior to the Second Reference Time, (the '+' superscript denotes 'after the First Reference Time and prior to the Second Reference Time');
F is the prevailing price of the underlying futures contract or the corresponding yield of the underlying interest rate futures contract;
K is the strike price, the level of the underlying determined at (or around) the First Reference Time;
$\sigma_0$ is the prevailing implied volatility relating to the remaining time until the Second Reference Time; and
$\theta$ the remaining time in years until the Second Reference Time.

Once the strike has been fixed, the option contract's price also becomes sensitive to the underlying. This may be dealt with in the normal fashion by delta-hedging, (as it would typically be with all other option positions). Below we demonstrate that, except in certain circumstances, the number of these contracts, (or of contracts that comprise other embodiments described below), which hedges an option position against changes in the implied volatility relating to the remaining Reference Period is the same as the number which hedges the gamma of that option, and so the changes in the delta of that number of contracts tend to track the changes in delta of the option being hedged.

As an alternative to delta-hedging the option contracts, the buyer (or seller) may be prepared to run a basis risk by rolling out of the position in the option contract prior to the determination of its strike into the next-nearest contract month thereby using the latter contract as a proxy hedge for the volatility exposure relating to the Reference Period of the former contract—in a similar way that the next interest rate future is often used as a proxy hedge for 'spot' (i.e. near-term) interest rate exposure.

Once the Second Reference Time has occurred, any outstanding contracts are settled at their settlement price defined as:

$$V_C^f = \text{Max}\left[\frac{F^f}{K} - 1, 0\right]$$

where:

$V_C^f$ is the final settlement price of the option contract per unit of the specified currency amount, (the 'f' superscript denotes 'final'); and $F^f$ is the price of the underlying futures contract or the corresponding yield of the underlying interest rate futures contract as determined at (or around) the Second Reference Time.

In accordance with another embodiment, a contract has a payout equal to the percentage fall, if any, of the underlying from the First Reference Time to the Second Reference Time multiplied by some specified currency amount.

Effectively, this contract is a cash-settled put option contract whose strike is fixed at-the-money at the First Reference Time.

Again, we consider the case where the underlying is the price of a futures contract or the corresponding yield of an interest rate futures contract. At any time prior to and until the First Reference Time, the price of the option contract is related to the implied volatility of the Reference Period, in the Black-Scholes framework, in precisely the same way as for the corresponding call option contract, (as given above), i.e.

$$V_P^- = D \cdot \left[N\left(\frac{\sigma\sqrt{\tau}}{2}\right) - N\left(-\frac{\sigma\sqrt{\tau}}{2}\right)\right] = V_C^-$$

the 'P' subscript denoting a 'put'-type contract. For these types of underlying, prior to the fixing of the strike, the price of the call and the put option contracts should theoretically track each other perfectly.

From the First Reference Time the option contract takes the form of a regular put option with a known strike, and at any time thereafter and prior to the Second Reference Time, the price of the option contract is related to the implied volatility for the remaining period, in the Black-Scholes framework, by the equation:

$$V_P^+ = D \cdot \left[N\left(\frac{\ln(K/F) + 1/2\sigma_0^2\theta}{\sigma_0\sqrt{\theta}}\right) - \frac{F}{K}N\left(\frac{\ln(K/F) - 1/2\sigma_0^2\theta}{\sigma_0\sqrt{\theta}}\right)\right] =$$

$$V_C^+ + D \cdot \left[1 - \frac{F}{K}\right]$$

Because the strike is the same for both the call and the put option contracts, their prices continue to be linked after the First Reference Time through the formula above, (known as the put-call parity relationship). It may therefore be argued that there is a theoretical redundancy in having both calls and puts. However, there is a practical benefit. The existence of both allows speculators to establish prior to the First Reference Time one of a variety of 'static strategies' at inception by mixing calls and puts in differing proportions. (Static strategies are strategies which are evaluated purely on their payout profile if held to expiration). If, however, only one of calls, puts or (indeed) straddles were made available, then speculators would need to trade in the underlying close to the time that the strike is set in order to bias their position so as to obtain the strategy they desire.

Once the Second Reference Time has occurred, any outstanding put option contracts are settled at their settlement price defined as:

$$V_P^f = \text{Max}\left[1 - \frac{F^f}{K}, 0\right]$$

In the case where the underlying is the level of an equity index, for example, then the price of the call and the put option contract will additionally depend on the cost of carry of the shares comprising the index over the Reference Period. If this cost of carry is positive, we would expect, at any time prior to and until the First Reference Time, the price of the call option to be greater than the price of the put option, and vice versa. The price of the call option during this period, in this case, can be expressed as, (D=1):

$$V_C^- = R \cdot N\left(\frac{\sigma\sqrt{\tau}}{2} + \varepsilon\right) - N\left(-\frac{\sigma\sqrt{\tau}}{2} + \varepsilon\right)$$

where:

$$\varepsilon = \frac{\ln(R)}{\sigma\sqrt{\tau}}$$

and R is the "carry factor", i.e. the anticipated ratio of the forward level to the spot level of the index as at the First Reference Time. Similarly, the price of the put option prior to and until the First Reference Time, in this case, can be expressed as, (D=1):

$$V_P^- = N\left(\frac{\sigma\sqrt{\tau}}{2} - \varepsilon\right) - R \cdot N\left(-\frac{\sigma\sqrt{\tau}}{2} - \varepsilon\right)$$

For a three month Reference Period, R will typically be in the range of 0.98 to 1.02. The price-volatility graphs for the call and the put are still virtually linear except at exceptionally low volatilities, (i.e. σ<10%), and (as before) at exceptionally high volatilities.

Whilst a position in such a call option or put option prior to the First Reference Time creates an exposure to the carry factor, an equal position in both is virtually insensitive to the carry factor (at typically volatility and carry factor levels) and hence provides a virtually pure exposure to the volatility. Conversely, an equal and opposite position in both provides a pure exposure to the carry factor.

For some underlyings, interest rates perhaps, it may be more appropriate that the call and put option contracts have payouts which are the absolute rise or fall, if any, in that underlying, (rather than the percentage rise or fall), multiplied by some specified currency amount, (e.g. a change in interest rates from 4% to 5% and from 5% to 6% are both considered as a change of 1% rather than a change of 25% and 20% respectively). These embodiments also are within the contemplation of the invention.

If the underlying in these embodiments is the price of a futures contract or the corresponding yield of an interest rate futures contract, then at any time prior to and until the First Reference Time, the price of both the call and the put option contract is related to the implied volatility for the Reference Period, in the Black-Scholes framework, by the slightly different equation:

$$V_{C,P}^- = D \cdot F \cdot \left[ N\left(\frac{\sigma\sqrt{\tau}}{2}\right) - N\left(-\frac{\sigma\sqrt{\tau}}{2}\right) \right]$$

We see here that, in this case, the price of the option contract prior to the First Reference Time depends on the level of the underlying, but in a relatively simple fashion which may be delta-hedged:

$$\frac{\partial V_{C,P}^-}{\partial F} = D \cdot \left[ N\left(\frac{\sigma\sqrt{\tau}}{2}\right) - N\left(-\frac{\sigma\sqrt{\tau}}{2}\right) \right] = \frac{V_{C,P}^-}{F}$$

The vega of the option contract is given by:

$$\frac{\partial V_{C,P}^-}{\partial \sigma} = D \cdot F \cdot \exp\left(-\frac{\sigma^2 \tau}{8}\right) \cdot \frac{\sqrt{\tau}}{\sqrt{2\pi}} \approx D \cdot F \cdot \frac{\sqrt{\tau}}{\sqrt{2\pi}}$$

and so is proportional to the level of the underlying. If F tends to make small fluctuations in percentage terms, then the vega of the option contract will similarly make small percentage fluctuations. If F has diffused by a material amount, some adjustment will be necessary to restore the original desired vega.

From the First Reference Time, the option contract again takes the form of a regular call or put option with a known strike, and at any time thereafter and prior to the Second Reference Time, the prices of the option contracts are related to the implied volatility for the remaining period, in the Black-Scholes framework, by the equations (in this case):

$$V_C^+ = D \cdot \left[ F \cdot N\left(\frac{\ln(F/K) + \frac{1}{2}\sigma_0^2 \theta}{\sigma_0 \sqrt{\theta}}\right) - K \cdot N\left(\frac{\ln(F/K) - \frac{1}{2}\sigma_0^2 \theta}{\sigma_0 \sqrt{\theta}}\right) \right]$$

$$V_P^+ = D \cdot \left[ K \cdot N\left(\frac{\ln(K/F) + \frac{1}{2}\sigma_0^2 \theta}{\sigma_0 \sqrt{\theta}}\right) - F \cdot N\left(\frac{\ln(K/F) - \frac{1}{2}\sigma_0^2 \theta}{\sigma_0 \sqrt{\theta}}\right) \right] =$$

$$V_C^+ + D \cdot [K - F]$$

Once the Second Reference Time has occurred, any outstanding contracts are settled at their settlement prices defined (in this case) as:

$$V_C^f = \text{Max}\lfloor F^f - K, 0 \rfloor$$

-continued $$V_P^f = \text{Max}\lfloor K - F^f, 0 \rfloor$$

Another embodiment comprises a contract which is a physically-settled call option in favour of one party, (the buyer), expiring at the Second Reference Time. The strike for this call option contract is determined at the First Reference Time. The quantity of the underlying asset which the buyer has the right to purchase may be, in two different embodiments, either specified in absolute terms or in value terms by reference to its price which is determined at the First Reference Time.

Another embodiment comprises a contract which is a physically-settled put option in favour of one party, (the buyer), expiring at the Second Reference Time. The strike for this put option contract is determined at the First Reference Time. The quantity of the underlying asset which the buyer has the right to deliver may be, in two different embodiments, either specified in absolute terms or in value terms by reference to its price which is determined at the First Reference Time.

Three other embodiments comprise (i) a contract, which shall be called herein a "relative quadratic call," which has a payout equal to the square of the percentage gain, if any, of the underlying from the First Reference Time to the Second Reference Time multiplied by some specified currency amount, (ii) a contract, which shall be called herein a "relative quadratic put," which has a payout equal to the square of the percentage fall, if any, of the underlying from the First Reference Time to the Second Reference Time multiplied by some specified currency amount, and (iii) a contract, which shall be called herein a "relative quadratic straddle," which has a payout equal to the square of the percentage gain or fall of the underlying from the First Reference Time to the Second Reference Time multiplied by some specified currency amount.

In the case where the underlying is the price of a futures contract or the corresponding yield of an interest rate futures contract, then at any time prior to and until the First Reference Time, the price of the relative quadratic straddle and the implied volatility for the Reference Period are related, in the Black-Scholes framework, by the equation:

$$Q_S^- = D \cdot (e^{\sigma^2 \tau} - 1) \approx D \cdot \sigma^2 \tau$$

where:

$Q_S^-$ is the price of the relative quadratic straddle per unit of the specified currency amount, at a time prior to and until the First Reference Time, (the 'S' subscript denotes a 'straddle'-type contract).

In those circumstances where D is 1, the price of the contract prior to the fixing of the strike is a function of the implied volatility only. In this case, the value of the contract is very closely proportional to the square of the volatility for typical values of σ and τ.

At any time from the First Reference Time and prior to the Second Reference Time the price of the contract and the implied volatility for the remaining period are related, in the Black-Scholes framework, by the equation:

$$Q_S^+ = D \cdot \left[ \left(\frac{F}{K} - 1\right)^2 + \left(\frac{F}{K}\right)^2 \left(e^{\sigma_0^2 \theta} - 1\right) \right]$$

where:

$Q_S^+$ is the price of the quadratic straddle per unit of the specified currency amount of the contract, at some time during the Reference Period.

The relative quadratic straddle has the feature that, once its strike has been set, its gamma is independent of the level of the underlying:

$$\Gamma = D \cdot \frac{2}{K^2} e^{\sigma_0^2 \theta} \approx D \cdot \frac{2}{K^2} (1 + \sigma_0^2 \theta)$$

This is to be compared with the gammas of the linear contracts mentioned previously which vary considerably with the level of the underlying. Additionally, the gamma of the relative quadratic straddle is significant right up to the Second Reference Time. These features of the relative quadratic straddle may make them more appealing for hedging the gamma of option positions, and we return to this point later.

Once the Second Reference Time has occurred, any outstanding contracts will be settled at their settlement prices defined as:

$$Q_S^f = \left(\frac{F}{K} - 1\right)^2$$

Three further embodiments comprise (i) a contract, which shall be called herein an "absolute quadratic call," which has a payout equal to the square of the absolute gain, if any, of the underlying from the First Reference Time to the Second Reference Time multiplied by some specified currency amount, (ii) a contract, which shall be called herein an "absolute quadratic put," which has a payout equal to the square of the absolute fall, if any, of the underlying from the First Reference Time to the Second Reference Time multiplied by some specified currency amount, and (iii) a contract, which shall be called herein an "absolute quadratic straddle," which has a payout equal to the square of the absolute gain or fall of the underlying from the First Reference Time to the Second Reference Time multiplied by some specified currency amount.

Further embodiments comprise contracts as described with respect to one of the embodiments above but whose strike is determined by applying some prescribed adjustment (absolute and/or multiplicative) to the price of the underlying as determined at the First Reference Time. These contracts become in-the-money or out-of-the-money call or put options at the First Reference Time. These contracts allow speculators and financial institutions the ability to trade or hedge the forward "skew," (the observed dependence of volatility on strike price).

Further embodiments comprise a combination of a call option and put option contract as described with respect to one of the embodiments above to form a straddle or strangle.

Other embodiments comprise contracts whose payout varies in some other fashion as the level of the underlying determined at (or around) the Second Reference Time varies relative to the level determined at (or around) the First Reference Time, in accordance with some other function.

We now turn our attention to how these contracts may be used to hedge the gamma as well as the vega of an options portfolio.

The gamma of the contracts whose embodiments have been described above is non-zero during the Reference Period. "Near-term contracts," (being those in their Reference Period), could therefore be used to hedge the gamma exposure of an option portfolio.

We now demonstrate that within the time-dependent Black-Scholes framework, with certain limited exceptions, the number of near-term contracts which hedges the gamma of an option is precisely the same number which hedges that option to small changes in the volatility pertaining to the remaining period up to the contract's Second Reference Time.

The value of an option at some time, $t_0$, can be expressed as the discounted expectation of its value at a later time, $t_0 + \Delta t$, under the assumption of "risk-neutrality". According to the assumption of risk-neutrality, the drift rate of the underlying is changed from its true value, μ, so that the underlying is assumed to follow the modified stochastic differential equation:

$$\frac{dS}{S} = \mu'(t)dt + \sigma(t)dz$$

where $\mu'(t)$ is the instantaneous rate for the cost of carry of the underlying. The risk-neutral probability distribution function for $\ln(S(t_0 + \Delta t))$ is Normal with an adjusted mean equal to:

$$\ln S_0 + \mu_0' \Delta t - \frac{1}{2} \sigma_0^2 \Delta t$$

and (unadjusted) variance equal to:

$$\sigma_0^2 \Delta t$$

where $S_0 = S(t_0)$, and $\mu_0'$ and σhd $0^2$ are the mean values of it $\mu'(t)$ and $\sigma^2(t)$ respectively over the interval $t_0$ to $t_0 + \Delta t$.

Now, provided that the value of the option at time $t_0 + \Delta t$ can be determined by reference to the level of S at that time and does not depend on any value of S between $t_0$ and $t_0 + \Delta t$, (which therefore excludes options which are capable of being exercised between $t_0$ and $t_0 + \Delta t$), then the value of the option at time $t_0$ is:

$$X(S_0, t_0) = PV \left[ \int_{-\infty}^{\infty} \frac{e^{-(\ln S - (\ln S_0 + \mu_0' \Delta t - \frac{1}{2} \sigma_0^2 \Delta t))^2 / (2\sigma_0^2 \Delta t)}}{\sqrt{2\pi \sigma_0^2 \Delta t}} \cdot X(S, t_0 + \Delta t) d(\ln S) \right]$$

where PV[·] means "the present or discounted value of".

By direct differentiation of the above formula, it can be proven that the "near-term vega," (defined as the sensitivity of the value of the option to the near-term volatility, $\sigma_0$), and the gamma are related by the following equation:

$$\frac{\partial X}{\partial \sigma_0} = 2\sigma_0 \frac{\partial X}{\partial (\sigma_0^2)} = \sigma_0 S_0^2 \frac{\partial^2 X}{\partial S_0^2} \Delta t$$

(In the case of any simple option whose payout is determined purely by the value of the underlying at expiration, the above formula is correct even when $\Delta t$ is taken to be the entire time remaining to expiration of the option. This then provides a relationship between the full-term vega and the gamma of these options).

Importantly, this equation demonstrates that the near-term vega and the gamma are in a common ratio for all options with the same underlying which meet the criterion stated above.

If $\Delta t$ refers to the remaining time until the Second Reference Time of a near-term inventive contract as described above, (i.e. $\theta$), then it is clear that the vega and gamma of that contract are related by the above formula. This will also be true of any derivative meeting the criterion above having an underlying which either is the same as that of the contract or which may be expressed in terms of the underlying of that contract.

Because of the common ratio between the near-term vega and the gamma, the number of contracts which is required to hedge the gamma of option positions (determined as the ratio of the gamma of the option positions to the gamma of one contract) is the same number that hedges the near-term vega of that option portfolio (determined as the ratio of the near-term vega of the option portfolio to the vega of one contract). In summary, an appropriate number of contracts will simultaneously hedge both the gamma and the near-term vega. (The exposure to changes in more distant volatility may be hedged with more distant contracts).

Even for options which do not meet the specified criterion, the relationship between the near-term vega and the gamma may be very nearly true. (For example, for an option which is contractually capable of being exercised between $t_0$ and $t_0 + \Delta t$ prior to its expiration date, but where the conditions at $t_0$ dictate that exercise during that period is very unlikely to occur).

Additional embodiments comprise option contracts which give the buyer the right but not the obligation to buy or sell a contract in the form of one of the embodiments above at a set strike at some time or times not later than the First Reference Time. Because the strike will correspond to a particular level of volatility, these contracts are effectively options on volatility.

For all the embodiments within the scope of this invention, it is not necessary that the underlying for the contract exists at any particular time other than the First and Second Reference Times. For example, when the underlying of the inventive contract is the price of a futures contract, that futures contract may not yet have been made available for trading at the time that the inventive contract is first made available for trading.

It should be understood that the invention also pertains to the situation in which the contract specifies that different underlyings are observed at the First and Second Reference Times if the level of one underlying at one of the Reference Times is related to the level of the other underlying. Examples of this are (i) the price of an equity index future at the First Reference Time and the level of the relevant equity index at the Second Reference Time, when the Second Reference Time is the time at (or around) which the settlement price of the equity index future is determined, and (ii) the yield corresponding to the price of an interest rate future at the First Reference Time and the relevant interest rate at the Second Reference Time, when the Second Reference Time is the time at (or around) which the settlement price of the interest rate future is determined.

Also within the scope of this invention is a contract as described herein which incorporates some averaging and/or rounding/truncation of the level of the underlying at (or around) the First and/or Second Reference Time, or of the strike(s).

Additionally within the scope of this invention is a contract which becomes, converts into or requires delivery of (from one party to the other) an option, straddle or strangle position with strike(s) determined with reference to the level of the underlying observed at or around the First Reference Time in accordance with one of the aforementioned embodiments.

Looking at the drawings, FIG. 1 is an exemplary flow of the inventive process. Contracts are made available for trading on an exchange, with contract conditions specified. Levels of the underlying are determined at first and second reference times. Then, any remaining contracts are settled.

Figure 2A:
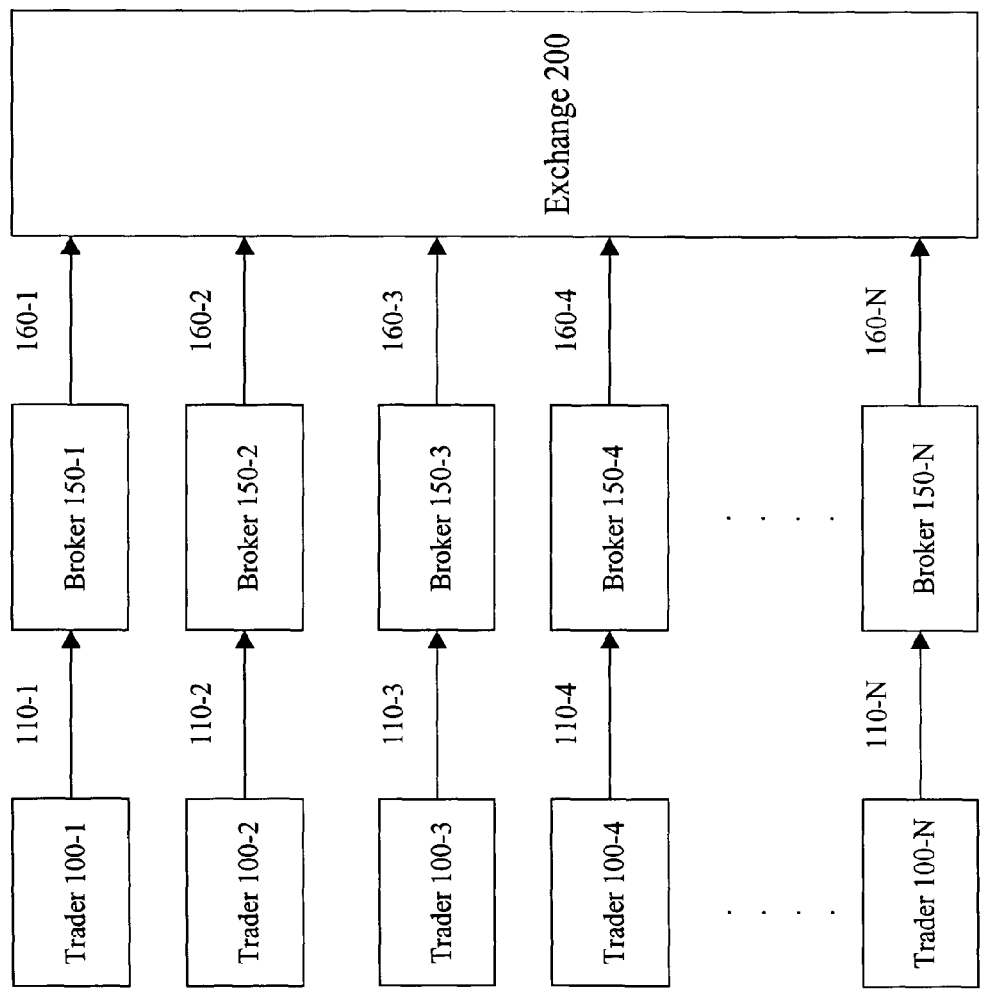
FIGS. 2a and 2b describe exemplary flow of transactions relative to options traded on a futures and options exchange.
Figure 2A:
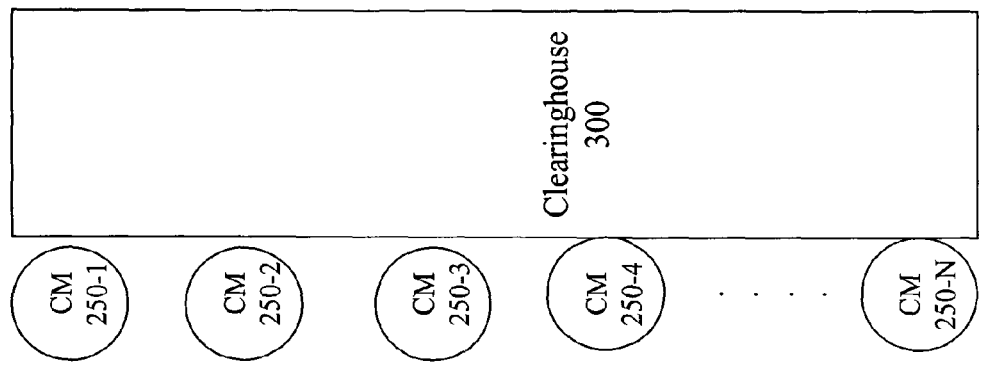
Figure 2B:
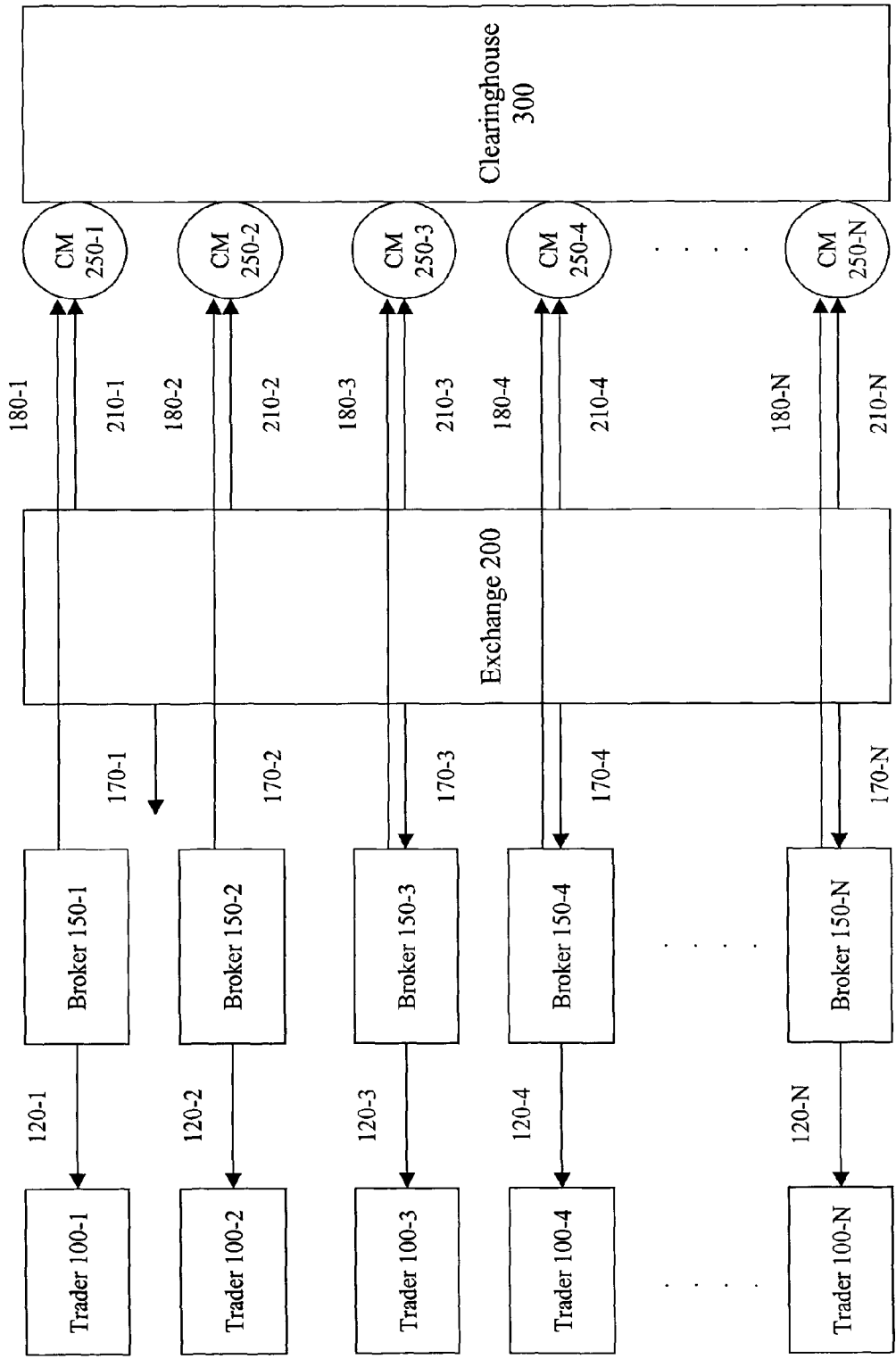

FIGS. 2a and 2b illustrate an exemplary flow of transactions relative to option contracts traded on a futures and options exchange. By way of example, traders may initiate a sale or a purchase of option contracts, and otherwise may engage in trading of such contracts or other financial instruments. Traders can be individual investors, investment firms of varying sizes, companies with pension plans under management, large financial institutions such as investment banks and/or governments, or any other type of individual or business entity which engages in trading of financial instruments.

Referring to FIG. 2a, in the normal course, each order (indicated by the suffix 1 through to N), is communicated by a trader (100-1 to 100-N, not necessarily all distinct) to one of the trader's preferred brokers (150-1 to 150-N, not necessarily all distinct) through any number of media 110-1 through 110-N. "Media" may include, but are not limited to, wide area networks, local area networks, the Internet, telephone orders, e-mail orders, face to face orders, "snail mail" service, hand delivery, or through other courier services. Some traders may have direct access to the exchange and need not use a broker, (e.g. those known as "locals" who trade for their own account at an open-outcry exchange, and some large institutions who prefer to execute their own orders) in which case the trader and the broker are coincident. The orders are submitted to the exchange (200) by any number of media, (160-1 to 160-N), as described above and possibly including open outcry, as permitted by the exchange in the hope of finding willing counterparties. Normally, the priority of execution at any time amongst buy orders is on the quality of the price (highest first) and then, (amongst buy orders at the same price), on a first-come-first-served basis. Similarly, the priority of execution at any time amongst sell orders is normally on the quality of the price (lowest first) and then, (amongst sell orders at the same price), on a first-come-first-served basis.

Looking now at FIG. 2b, successfully executed orders (or parts thereof) are then reported back to the broker by the exchange (by any number of media, 170-1 to 170-N, as described above), or the broker may experience the execution directly at the exchange in the case of open outcry. The broker reports the successfully executed orders back to the trader (by any number of media, 120-1 to 120-N, again as described above). Additionally the broker and/or the exchange (by any number of media, 180-1 to 180-N and 210-1 to 210-N respectively, as described above) will report the successfully executed order to the clearinghouse member, "CM," (one of 250-1 to 250-N, not necessarily all distinct) with whom the trader holds its account. The clearinghouse (300) matches buyers and sellers of the option contracts by acting as the seller to each buyer and the buyer to each seller. This approach ensures that parties are not subject to default by their counterparties and eliminates the need to keep track of the buyer and seller of each individual contract traded. The clearinghouse margins each of the clearinghouse members, and the clearinghouse members margin each of the traders who hold their account with them.

Some orders may not be executed in their entirety, because the order in respect of unexecuted contracts is withdrawn by the trader or because there is insufficient demand for/supply of contracts at the price proffered for sale/purchase.

It should not be inferred from these diagrams that the communications illustrated occur simultaneously. In reality, orders are submitted on a large number of occasions throughout the period that the contract is available for trading. The execution of matching concurrent buy and sell orders on the exchange (up to the lower of the buy quantity and sell quantity) does occur at essentially the same time. The reporting of both sides of the executed trades (to the traders and/or to the clearing member/clearing house) may occur simultaneously depending on how this information is reported and conveyed.

Figure 3A:
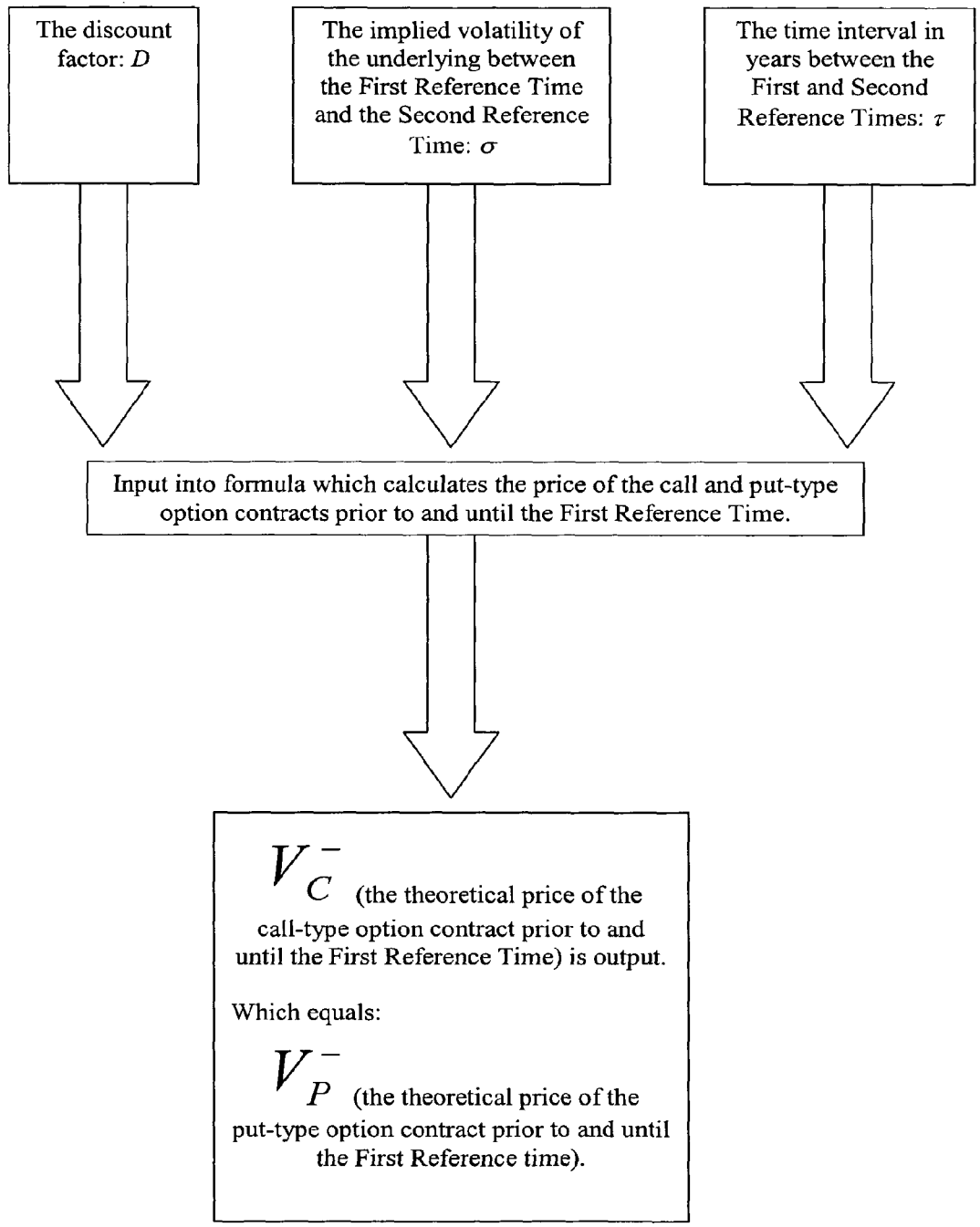
FIG. 3a illustrates calculation of an option price at a given point in time.

FIG. 3a illustrates calculation, in the Black-Scholes framework and for a particular implied volatility, of the price of an option contract per unit of the contract's specified currency amount prior to the First Reference Time in the case that the underlying is the price of a futures contract or the corresponding yield of an interest rate futures contract, and the option contract's payout is equal to the percentage gain, if any, (in the case of a call-type option) or the percentage fall, if any, (in the case of a put-type option) of the underlying over the Reference Period multiplied by a specified currency amount. Since the price at this point is equal for both call and put options, the same process can by used to find the prices of both. This value can be achieved by inputting the discount factor, (which may have been determined from interest rates and the time from the payment of the premium until the final settlement of outstanding contracts), the implied volatility of the underlying relating to the Reference Period, and the length of the Reference Period.

Figure 3B:
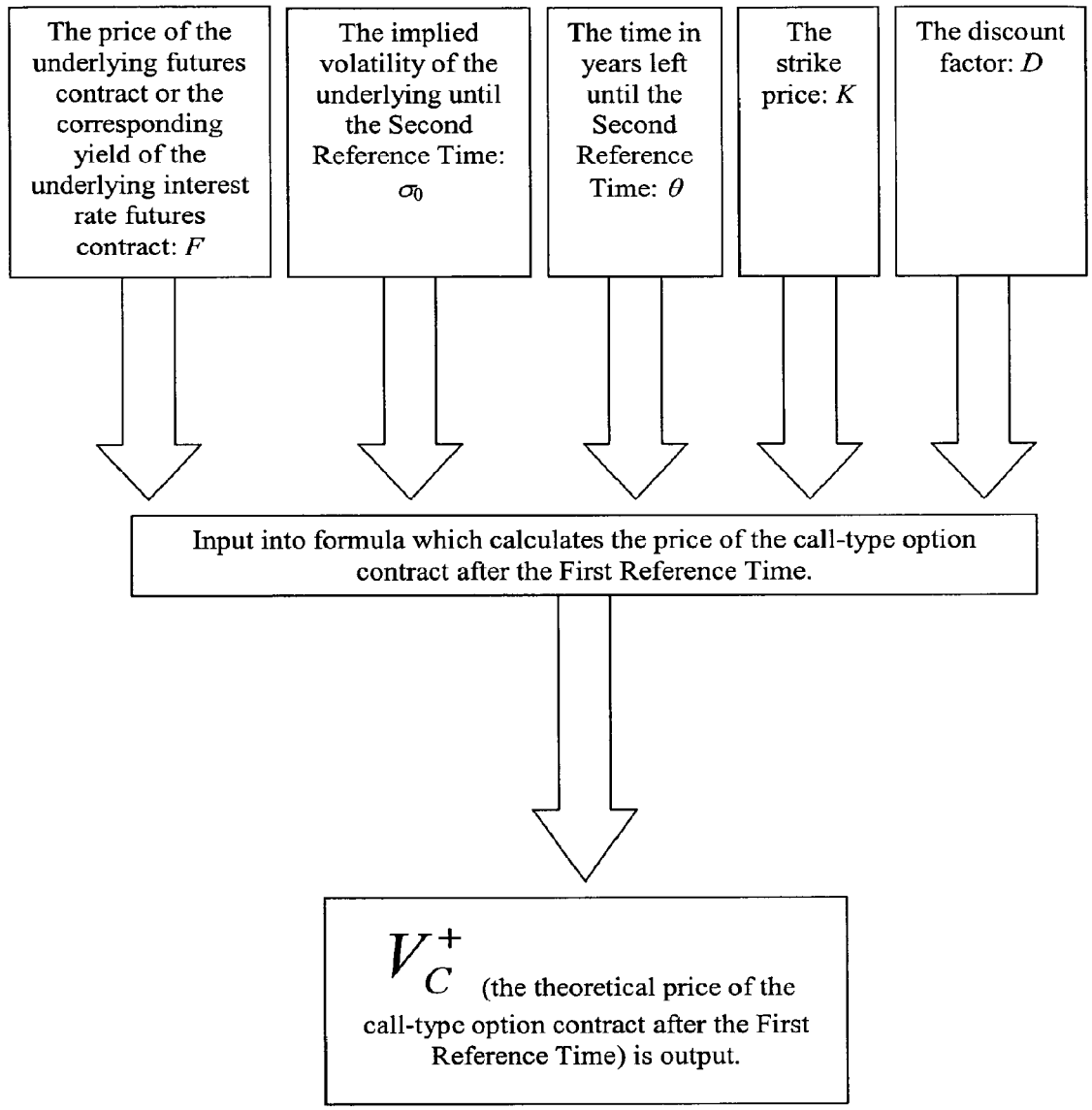
FIG. 3b illustrates calculation of the price of a call-type option at a given point in time.

FIG. 3b illustrates a calculation of the price of such a call-type option contract after the First Reference Time. Per the formulae discussed above, inputs include the price of the underlying futures contract or the corresponding yield of the underlying interest rate futures contract, the strike price, the implied volatility relating to the remaining time until the Second Reference Time, the discount factor, and the length of the time remaining in the Reference Period.

Figure 3C:
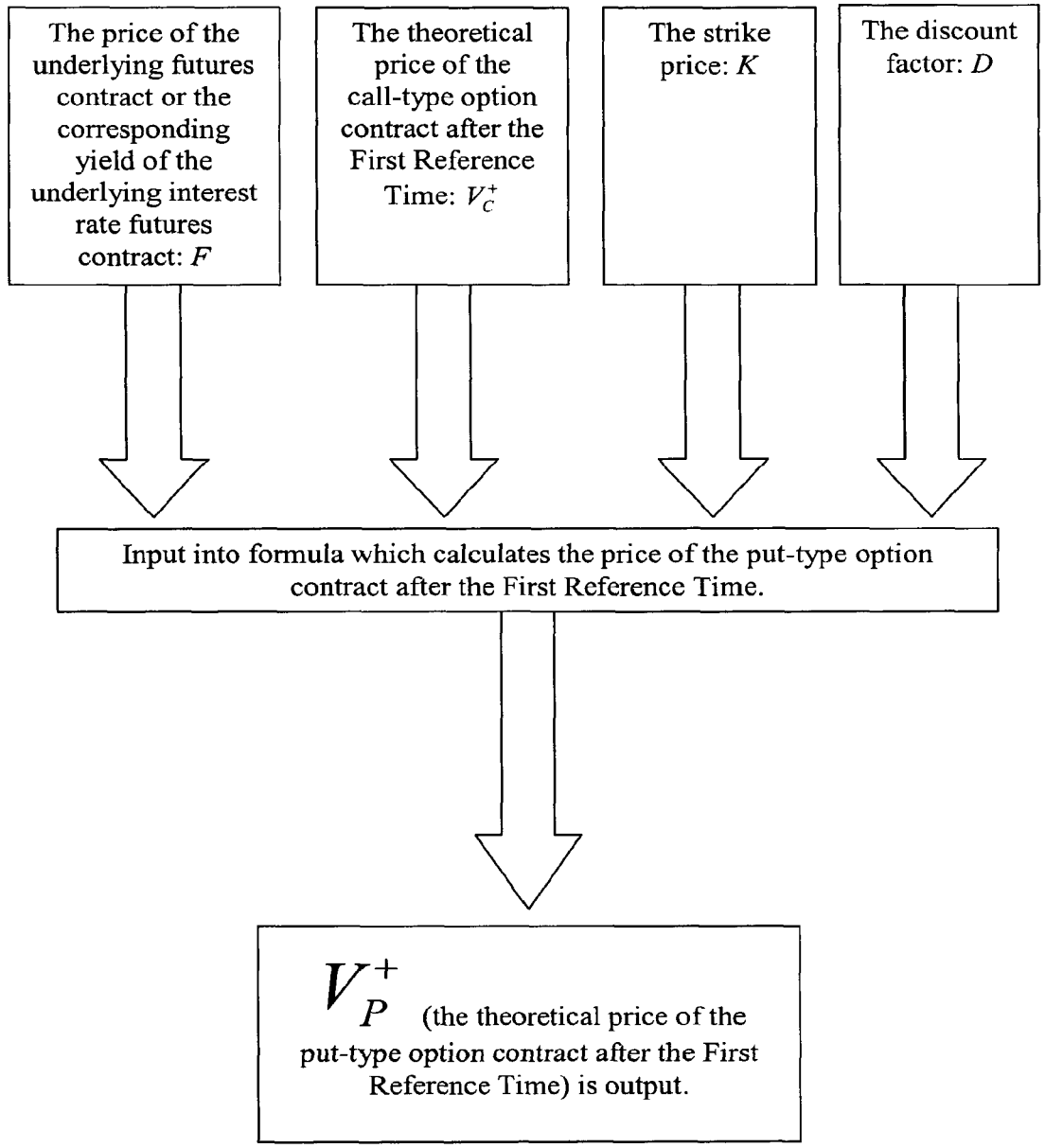
FIG. 3c illustrates calculation of a put-type option at a given point in time.

FIG. 3c illustrates a calculation of the price of such a put-type option contract after the First Reference Time using the put-call parity relationship. Input are the price for the same option if it were a call-type option, the strike price, the price of the underlying futures contract or the corresponding yield of the underlying interest rate futures contract, and the discount factor.

From the foregoing mathematics, it would be equally possible to calculate V; using precisely the same inputs as for the call-type option. Equally, it is possible to calculate the price of the call-type option (through the put-call parity relationship) using the price of the put-type option, the strike price, the price of the underlying futures contract or the corresponding yield of the underlying interest rate futures contract, and the discount factor.

It also should be noted that it is possible to determine the implied volatility which, in accordance (for example) with the method illustrated in FIG. 3a, would generate a given price. This calculation may employ a search using known techniques, including the Newton-Raphson method.

While the present invention has been described in detail above with reference to several embodiments, various modifications and changes within the scope and spirit of the invention will be apparent to those of working skill in this technological field. Accordingly, the invention is limited only by the scope of the following claims.

What is claimed is:

1. A computer-implemented method for trading, between a buyer and a seller at an exchange, a futures exchange, an options exchange, or a futures and options exchange, the method being performed on a computer system, the method comprising:

receiving, by the computer system, first inputs from the buyer and seller corresponding to a standardized form of contract for trading at a price on which the buyer and the seller agree, the standardized form of contract having contract terms requiring the buyer and seller to settle based on a final settlement price;

receiving, by the computer system, second inputs from the buyer and the seller at or prior to a first reference time wherein the second inputs include bid prices and offer prices for the standardized form of contract; and matching, in the computer system, the first inputs and the bid prices and the offer prices and forming a contract based, at least in part, on the matching;

wherein said final settlement price is being determined, in accordance with the contract terms, by reference to both a first level of an underlying and a second level of an underlying, the first level of the underlying being substantially a value of the underlying at said first reference time prior to settlement of the contract, the first reference time determined in accordance with the contract terms, the underlying being a specified observable quantity selected from a group consisting of a stock price, a commodity price, a financial asset price, a basket of financial assets price, a financial index value and a financial contract price, the second level of the underlying being substantially the value of the underlying at a second reference time prior to settlement of the contract, the second reference time determined in accordance with the contract terms and being later than said first reference time; and wherein the contract is available to trade before said first reference time.

2. The computer-implemented method of claim 1, wherein the final settlement price is determined, in accordance with the contract terms, to be one of:

i. substantially proportional to the excess of said second level over a call strike level, if said second level is greater than said call strike level, and zero if said second level is less than or equal to said call strike level, wherein said call strike level is substantially said first level subject to a multiplicative adjustment or additive adjustment, or no adjustment;

ii. substantially proportional to the excess of a put strike level over said second level, if said second level is less than said put strike level, and zero if said second level is greater than or equal to said put strike level, wherein said put strike level is substantially said first level subject to a multiplicative adjustment or additive adjustment, or no adjustment; and iii. substantially proportional to the excess of said second level over a call strike level, if said second level is greater than said call strike level, substantially proportional to the excess of a put strike level over said second level, if said second level is less than said put strike level, and zero if said second level is less than or equal to said call strike level and greater than or equal to said put strike level, wherein said call strike level is substantially said first level subject to a multiplicative adjustment or additive adjustment, or no adjustment, and wherein said put strike level is substantially said first level subject to a multiplicative adjustment or additive adjustment, or no adjustment.

3. The computer-implemented method of claim 1, wherein the final settlement price is determined, in accordance with the contract terms, to be one of:
   i. substantially proportional to the square of the excess of said second level over a call strike level, if said second level is greater than said call strike level, and zero if said second level is less than or equal to said call strike level, wherein said call strike level is substantially said first level subject to a multiplicative adjustment or additive adjustment, or no adjustment;
   ii. substantially proportional to the square of the excess of a put strike level over said second level, if said second level is less than said put strike level, and zero if said second level is greater than or equal to said put strike level, wherein said put strike level is substantially said first level subject to a multiplicative adjustment or additive adjustment, or no adjustment; and
   iii. substantially proportional to the square of the excess of said second level over a call strike level, if said second level is greater than said call strike level, substantially proportional to the square of the excess of a put strike level over said second level, if said second level is less than said put strike level, and zero if said second level is less than or equal to said call strike level and greater than or equal to said put strike level, wherein said call strike level is substantially said first level subject to a multiplicative adjustment or additive adjustment, or no adjustment, and wherein said put strike level is substantially said first level subject to a multiplicative adjustment or additive adjustment, or no adjustment.

4. The computer-implemented method of claim 1, wherein the final settlement price, in accordance with the contract terms, is dependent on:
   the quotient of said second level of the underlying divided by said first level of the underlying;
   minus one, or another constant;
   minus the logarithm of the quotient of said second level of the underlying divided by said first level of the underlying.

5. The computer-implemented method of claim 1, wherein the contract is traded by telephone, internet, or a wide area network.

6. A computer-implemented method for submitting trade order information to an exchange, a futures exchange, an options exchange, or a futures and options exchange, the method being performed on a computer system, the method comprising:
   transmitting, by the computer system, first outputs corresponding to a standardized form of contract for trading at a price on which a buyer and a seller agree, the standardized form of contract having contract terms requiring the buyer and seller to settle based on a final settlement price; and
   transmitting, by the computer system, second outputs at or prior to a first reference time wherein the second outputs include at least one bid price or offer price for the standardized form of contract;
   wherein said final settlement price is being determined, in accordance with the contract terms, by reference to both a first level of an underlying and a second level of an underlying, the first level of the underlying being substantially a value of the underlying at said first reference time prior to settlement of the contract, the first reference time determined in accordance with the contract terms, the underlying being a specified observable quantity selected from a group consisting of a stock price, a commodity price, a financial asset price, a basket of financial assets price, a financial index value and a financial contract price, the second level of the underlying being substantially the value of the underlying at a second reference time prior to settlement of the contract, the second reference time determined in accordance with the contract terms and being later than said first reference time; and
   wherein the contract is available to trade before said first reference time.

7. The computer-implemented method of claim 6, wherein the final settlement price is determined, in accordance with the contract terms, to be one of:
   i. substantially proportional to the excess of said second level over a call strike level, if said second level is greater than said call strike level, and zero if said second level is less than or equal to said call strike level, wherein said call strike level is substantially said first level subject to a multiplicative adjustment or additive adjustment, or no adjustment;
   ii. substantially proportional to the excess of a put strike level over said second level, if said second level is less than said put strike level, and zero if said second level is greater than or equal to said put strike level, wherein said put strike level is substantially said first level subject to a multiplicative adjustment or additive adjustment, or no adjustment; and
   iii. substantially proportional to the excess of said second level over a call strike level, if said second level is greater than said call strike level, substantially proportional to the excess of a put strike level over said second level, if said second level is less than said put strike level, and zero if said second level is less than or equal to said call strike level and greater than or equal to said put strike level, wherein said call strike level is substantially said first level subject to a multiplicative adjustment or additive adjustment, or no adjustment, and wherein said put strike level is substantially said first level subject to a multiplicative adjustment or additive adjustment, or no adjustment.

8. The computer-implemented method of claim 6, wherein the final settlement price is determined, in accordance with the contract terms, to be one of:
   i. substantially proportional to the square of the excess of said second level over a call strike level, if said second level is greater than said call strike level, and zero if said second level is less than or equal to said call strike level, wherein said call strike level is substantially said first level subject to a multiplicative adjustment or additive adjustment, or no adjustment;
   ii. substantially proportional to the square of the excess of a put strike level over said second level, if said second level is less than said put strike level, and zero if said second level is greater than or equal to said put strike level, wherein said put strike level is substantially said first level subject to a multiplicative adjustment or additive adjustment, or no adjustment; and
   iii. substantially proportional to the square of the excess of said second level over a call strike level, if said second level is greater than said call strike level, substantially proportional to the square of the excess of a put strike level over said second level, if said second level is less than said put strike level, and zero if said second level is less than or equal to said call strike level and greater than or equal to said put strike level, wherein said call strike level is substantially said first level subject to a multiplicative adjustment or additive adjustment, or no adjustment, and wherein said put strike level is substantially said first level subject to a multiplicative adjustment or additive adjustment, or no adjustment.

9. The computer implemented method of claim 6, wherein the final settlement price, in accordance with the contract terms, is dependent on:
   the quotient of said second level of the underlying divided by said first level of the underlying;
   minus one, or another constant;
   minus the logarithm of the quotient of said second level of the underlying divided by said first level of the underlying.

10. The computer-implemented method of claim 6, wherein the trade order information is submitted by telephone, internet, or a wide area network.

11. A computer-implemented method for clearing contracts thorough a clearinghouse, the method being performed on a computer system, the method comprising:
    receiving, by the computer system, first inputs corresponding to a standardized form of contract for trading at a price on which a buyer and a seller agree, the standardized form of contract having contract terms requiring the buyer and seller to settle based on a final settlement price;
    receiving, by the computer system, second inputs at or prior to a first reference time corresponding to the identity of a buyer (or their agent) or a seller (or their agent); and
    receiving, by the computer system, third inputs at or prior to a first reference time wherein the second inputs include a price for the standardized form of contract;
    wherein said final settlement price is being determined, in accordance with the contract terms, by reference to both a first level of an underlying and a second level of an underlying, the first level of the underlying being substantially a value of the underlying at said first reference time prior to settlement of the contract, the first reference time determined in accordance with the contract terms, the underlying being a specified observable quantity selected from a group consisting of a stock price, a commodity price, a financial asset price, a basket of financial assets price, a financial index value and a financial contract price, the second level of the underlying being substantially the value of the underlying at a second reference time prior to settlement of the contract, the second reference time determined in accordance with the contract terms and being later than said first reference time, and
    wherein the contract is available to trade before said first reference time.

12. The computer-implemented method of claim 11, wherein the final settlement price is determined, in accordance with the contract terms, to be one of:
    i. substantially proportional to the excess of said second level over a call strike level, if said second level is greater than said call strike level, and zero if said second level is less than or equal to said call strike level, wherein said call strike level is substantially said first level subject to a multiplicative adjustment or additive adjustment, or no adjustment;
    ii. substantially proportional to the excess of a put strike level over said second level, if said second level is less than said put strike level, and zero if said second level is greater than or equal to said put strike level, wherein said put strike level is substantially said first level subject to a multiplicative adjustment or additive adjustment, or no adjustment; and
    iii. substantially proportional to the excess of said second level over a call strike level, if said second level is greater than said call strike level, substantially proportional to the excess of a put strike level over said second level, if said second level is less than said put strike level, and zero if said second level is less than or equal to said call strike level and greater than or equal to said put strike level, wherein said call strike level is substantially said first level subject to a multiplicative adjustment or additive adjustment, or no adjustment, and wherein said put strike level is substantially said first level subject to a multiplicative adjustment or additive adjustment, or no adjustment.

13. The computer-implemented method of claim 11, wherein the final settlement price is determined, in accordance with the contract terms, to be one of:
    i. substantially proportional to the square of the excess of said second level over a call strike level, if said second level is greater than said call strike level, and zero if said second level is less than or equal to said call strike level, wherein said call strike level is substantially said first level subject to a multiplicative adjustment or additive adjustment, or no adjustment;
    ii. substantially proportional to the square of the excess of a put strike level over said second level, if said second level is less than said put strike level, and zero if said second level is greater than or equal to said put strike level, wherein said put strike level is substantially said first level subject to a multiplicative adjustment or additive adjustment, or no adjustment; and
    iii. substantially proportional to the square of the excess of said second level over a call strike level, if said second level is greater than said call strike level, substantially proportional to the square of the excess of a put strike level over said second level, if said second level is less than said put strike level, and zero if said second level is less than or equal to said call strike level and greater than or equal to said put strike level, wherein said call strike level is substantially said first level subject to a multiplicative adjustment or additive adjustment, or no adjustment, and wherein said put strike level is substantially said first level subject to a multiplicative adjustment or additive adjustment, or no adjustment.

14. The computer implemented method of claim 11, wherein the final settlement price, in accordance with the contract terms, is dependent on:
    the quotient of said second level of the underlying divided by said first level of the underlying;
    minus one, or another constant;
    minus the logarithm of the quotient of said second level of the underlying divided by said first level of the underlying.

15. The computer-implemented method of claim 11, wherein the inputs are received by telephone, internet, or a wide area network.

16. A computer-implemented method for displaying trade order information, reflecting buying and selling interest received by an exchange, a futures exchange, an options exchange, a futures and options exchange, or a clearinghouse, the method being performed on a computer system, the method comprising:

displaying, by the computer system, first outputs corresponding to a standardized form of contract for trading at a price on which a buyer and a seller agree, the standardized form of contract having contract terms requiring the buyer and seller to settle based on a final settlement price; and displaying, by the computer system, second outputs at or prior to a first reference time wherein the second outputs include at least one bid price or offer price for the standardized form of contract;

wherein said final settlement price is being determined, in accordance with the contract terms, by reference to both a first level of an underlying and a second level of an underlying, the first level of the underlying being substantially the value of the underlying at said first reference time prior to settlement of the contract, the first reference time determined in accordance with the contract terms, the underlying being a specified observable quantity selected from a group consisting of a stock price, a commodity price, a financial asset price, a basket of financial assets price, a financial index value and a financial contract price, the second level of the underlying being substantially the value of the underlying at a second reference time prior to settlement of the contract, the second reference time determined in accordance with the contract terms and being later than said first reference time, and wherein the contract is available to trade before said first reference time.

* * * * *